P. LEISTRITZ.
SPEED CHANGE GEAR.
APPLICATION FILED JULY 25, 1912.

1,115,843.

Patented Nov. 3, 1914.
2 SHEETS—SHEET 1.

P. LEISTRITZ.
SPEED CHANGE GEAR.
APPLICATION FILED JULY 25, 1912.
1,115,843.
Patented Nov. 3, 1914.
2 SHEETS—SHEET 2.
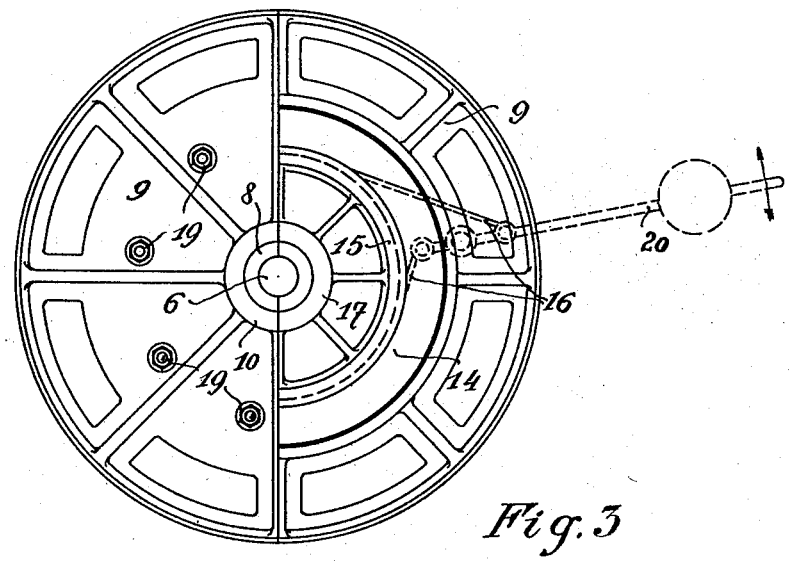
Fig. 3
Fig. 4.
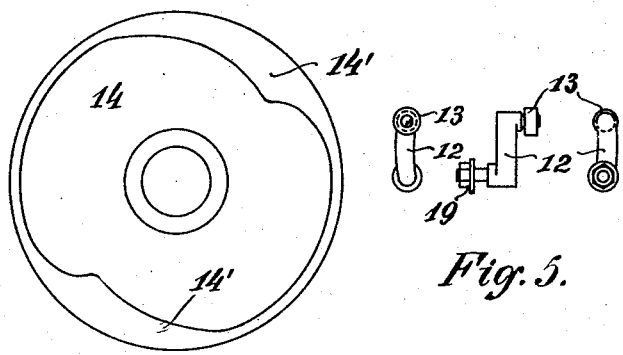
Fig. 5.

UNITED STATES PATENT OFFICE.

PAUL LEISTRITZ, OF NUREMBERG, GERMANY.

SPEED-CHANGE GEAR.

1,115,843.  Specification of Letters Patent.  Patented Nov. 3, 1914.

Application filed July 25, 1912. Serial No. 711,450.

*To all whom it may concern:*

Be it known that I, PAUL LEISTRITZ, of Markgrafenstrasse 29, Nuremberg, Germany, have invented an Improvement in or Relating to Speed-Change Gear, of which the following description, in connection with the accompanying drawing, is a specification.

This invention relates to a power transmission device provided with means for varying the speed of the driven member with respect to that of the driving member.

An object of the invention is to provide a device wherein the two members are disposed in centric relation, means being disposed on one of said members for transmitting the movement of the same to the other member.

Another object of the invention is to provide transmission means which may enter into engagement with the driven member at various parts of the same.

The construction according to this invention differs from known gears of the same kind by the use of only two wheels one of which is formed as a toothed wheel, while the other one is provided with a plurality of adjustable pins, the number of these pins being less or greater than the number of teeth of said wheel. The movement of the pins is controlled by a cam in such a manner that they alternately and consecutively engage the teeth of the gear at some point thereof. Means are also provided for imparting to the driven member the same speed which is imparted to the driving member, or in other words to lock the driven member with the driving member.

With these and other objects in view I have illustrated an embodiment of the invention in the accompanying drawing in which—

Figure 1:
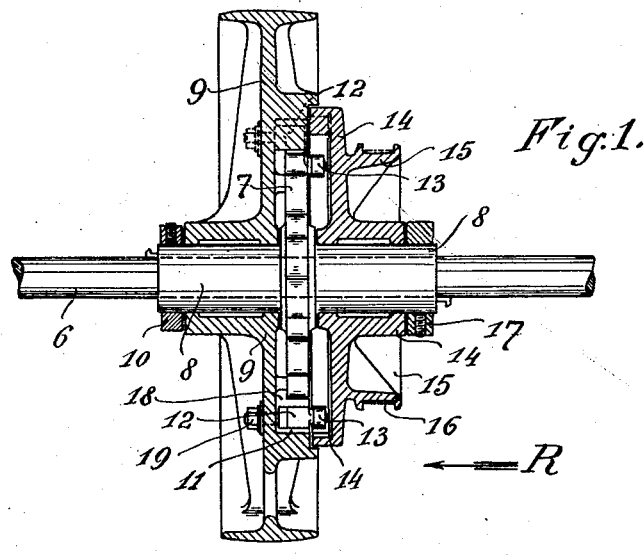
Figure 2:
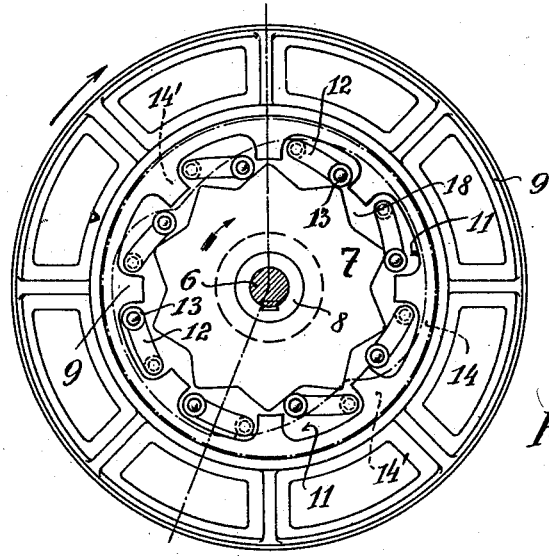

Figure 1 is a section through the device. Fig. 2 is a front elevation of the same, certain parts of the device being removed. Fig. 3 is partly an elevation from the other side and partly an elevation from the same side from which the device is viewed in Fig. 2. Fig. 4 is an elevation of a cam. Fig. 5 shows in different views the driving pins which serve for transmitting the movement from one member to the other member.

As long as the cam 14 is held stationary, there will be a fixed ratio of angular velocity between the driving member of the device and the driven member. The driven member will be rotated at a slower speed than the driving member, but rotation will be imparted to the same owing to the action of the cranks on the projections of the driven member. As long as the cam is stationary, the cranks will travel through a path which is partly given by the number and shape of the projections on the driven member and partly by the shape of the cam. When the cam is permitted to rotate, the ratio of angular velocities of the two members will be varied. If the cam may rotate freely with the pulley, the rollers 13 will be jammed between the projections on the star wheel and a certain portion of the cam, so that the star wheel will then be driven with the same speed as the pulley. The ratio of the angular velocities then equals 1 while that of the cam in stationary position under the conditions shown will be smaller than 1 and larger than 0. The ratio depends upon the number of cranks, the number of star projections on the driven wheel, the shape of the cam and the speed of the cam. Ordinarily in any given gear the first three factors, namely, the number of cranks, the number of star projections and the shape of the cam will be constant factors. The variation in the ratios therefore is due to the more or less high rate of movement of the cam.

7 is the spur wheel with outer teeth, provided at both sides with hub projections 8 and secured, if desired, to a spindle 6. The wheel 9 which in the present case is formed into a belt pulley, is mounted so as to rotate freely on one half of the hub of the spur wheel 7, and provided with a recess or bore 18 into which the spur wheel 7 fits. The edge of the pulley bore 18 is provided with a number of recesses 11 in which are mounted cranks 12 provided at their free ends with guide rollers 13 and pivoted to the pulley 9 by means of pins 19. The pulley 9 is held against axial displacement on hub projection 8 by means of a collar 10. For controlling or driving the cranks 12, a guiding cam 14 is used. This cam 14 forms part of a brake drum 15 rotatably mounted on the other half of the hub of the spur wheel 7 and held against axial displacement by a collar 17. At the corresponding opposite points, the disk 14 is provided with guide curves 14¹ (Fig. 4) by means of which the cranks 12 are driven or controlled by means of the rollers 13, so that they alternately and consecutively engage the teeth of the wheel, whereby the movement of one wheel is transmitted to the other on account of combined rolling and swinging movement of the rollers 13 on the teeth of the wheel 7. As the distance between the driving cranks in the present case has been made greater than the pitch of the teeth, the gear will act as a reducing gear when the pulley 9 is driven. This reduction is maintained as long as the guide curves remain stationary, that is to say, the cam 14 is held by the brake band 16 or by a weighted brake lever 20. If the brake is released, and the cam disk 14 can participate in the rotation, the driving and the driven wheel will rotate at the same speed, as the rollers 13 driving at the time, will become jammed between the guide curve and the tooth. It is also obvious that the movement can be started both from the toothed wheel 7 and from the belt pulley 9.

The operation of the device is about as follows: The pulley 9 is driven by means of a belt or the like not shown and the rotation of this pulley is to be transmitted through the device to the shaft 6. In the rotation of the pulley the rollers 13 of the cranks alternately and consecutively enter into engagement with the teeth of the spur wheel. If the cranks would not be controlled in any way by the cam disk 14 the rollers would simply ride over the surface of the teeth without transmitting the movement thereto. On account of the presence of the cam disk the engagement of the rollers 13 with the teeth of the wheel 7 is maintained for a certain time and during this engagement the rollers will push the wheel 7, imparting thereby rotation to the same. The guiding cams in the disk 14 are constructed and arranged so as to influence successively different rollers while in engagement with the wheel 7, whereby the rotation imparted to said last named wheel and shaft 6 is a permanent one. The speed of the rotation of the wheel 7 may be varied by releasing the cam 14 and imparting a relative movement to the same with respect to the wheel 7. The cam is connected with the brake drum 15 and this brake drum is normally held stationary by means of the weight on the brake lever 20. If the brake is released so that the drum 15 may freely rotate one or more of the rollers 13 will become jammed in between the surface of the tooth on the wheel 7 and a portion of the cam, so that the wheel 7 is then rotated with the same angular speed as the driving pulley 9.

Having now particularly described and ascertained the nature of my said invention and in what manner the same is to be performed, I declare that what I claim is:

1. A change speed gear comprising in combination a driving member, a driven member centrally disposed with respect to the driving member, a plurality of elements pivotally secured to one of said members, a plurality of projections on the other member and means for bringing the said elements consecutively in engagement with the projections on the other member and for maintaining said elements in a predetermined relation with respect to said member.

2. A change speed gear comprising in combination a driving member, a driven member centrally disposed with respect to said driving member, means for preventing a relative axial displacement of said members, a plurality of elements pivotally secured to one of said members, a plurality of projecting portions on the other member, and means for bringing said elements consecutively in engagement with said projecting portions of the other member for maintaining said elements in a predetermined relation with respect to said other member.

3. A change speed gear comprising in combination a driving member, a driven member centrally disposed with respect to said driving member, means for preventing relative axial displacement of said members, a plurality of cranks pivotally mounted in one of said members, projections on the other member and means for bringing the free ends of said cranks consecutively in engagement with different projections of the other member, said means being also held against axial displacement with respect to both of said members.

4. A change speed gear comprising in combination a driving member, a driven member centrally disposed with respect to said first named member and held against axial displacement with respect thereto, a plurality of cranks pivotally mounted on one of said members, projections on the other member, said cranks being adapted to engage consecutively different projections of the other member and a rotatable cam for maintaining said cranks for variable periods of time in engagement with said other member.

5. Change speed gear comprising in combination a driving member and a driven member centrally disposed with respect thereto, a plurality of cranks pivotally mounted in recesses of the driving member, the driven member being provided with projections, a brake drum mounted centrally with respect to both of said members, a cam connected with said brake drum and adapted to engage consecutively the free ends of the cranks to force the same for a variable period of time in engagement with the projections on the driven member.

In testimony whereof I affix my signature in presence of two witnesses.

PAUL LEISTRITZ.

Witnesses:
  HEINRICH FIETH,
  OSCAR BOCK.

---

Copies of this patent may be obtained for five cents each, by addressing the "Commissioner of Patents, Washington, D. C."